Figure 1:
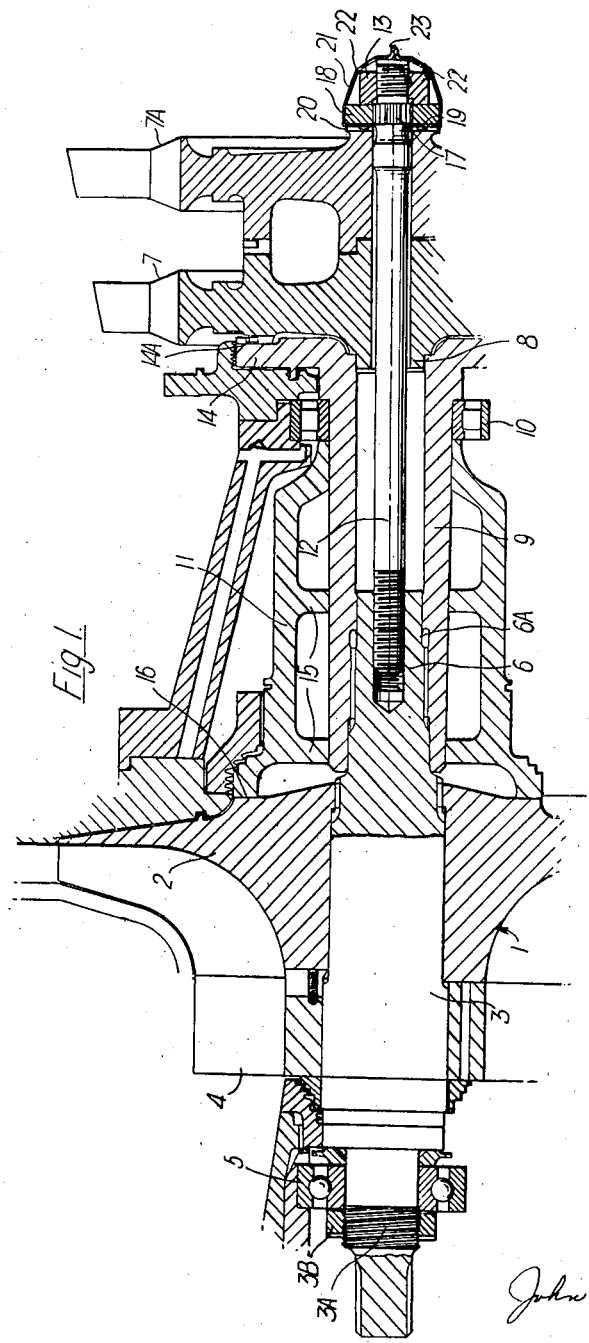

Dec. 25, 1962  J. H. WEAVING  3,070,286
GAS TURBINES
Filed March 14, 1961  2 Sheets-Sheet 2

John Harold Weaving
Inventor

By Scrivener & Parker
Attorneys

United States Patent Office 3,070,286
Patented Dec. 25, 1962

3,070,286
GAS TURBINES
John H. Weaving, Solihull, England, assignor to The Austin Motor Company Limited, Longbridge, Birmingham, England
Filed Mar. 14, 1961, Ser. No. 95,660
4 Claims. (Cl. 230—116)

This invention relates to improvements affecting the rotor system of gas turbines, the system in question comprising a compressor rotor coaxially driven by a turbine rotor or by an assembly of turbine rotors.

The problems which the invention overcomes, or reduces to small proportions, are associated with whirling speed of the rotor system and differential expansion of its components. Any rotor system has a fundamental whirling speed, and frequently harmonics of this fundamental arise. Also vibrations may possibly occur, associated with bearing mountings or other components of the rotor system.

It is possible to run the rotor system of a gas turbine either above or below its fundamental whirling speed. The invention is primarily concerned with measures for enabling such a rotor system to run below that speed; which is desirable, as it avoids running through a critical speed at which the attendant large deflections at various places can cause the rubbing of the turbine wheels on their shrouds, the compressor rotor on its casing, or, alternatively, rubbing on shaft seals. Hitherto those risks have only been obviated by allowing large clearances at the places affected, with consequent loss of efficiency. It is also highly desirable that the bearings of the rotor system should be of comparatively small diameter, otherwise the peripheral speed of the races, at the high rotational speeds necessary, becomes extremely high and results in short bearing life.

The desired characteristics are achieved by a combination of features afforded by the invention; according to which a rotor system of the character specified, for a gas turbine, comprises: (a) a hollow shaft of comparatively small diameter having at one end a flange which is arranged to locate the turbine rotor or rotor assembly by a restricted area of contact (to minimize thermal conduction and, therefore, the effects of differential expansion); (b) a shaft bearing disposed as close as may be to the flanged end of the hollow shaft (to minimize the overhang of the turbine rotor, as excessive overhang would reduce the whirling speed); (c) a coaxial sleeve of relatively large diameter surrounding that portion of the hollow shaft lying between the shaft bearing and the hub of the compressor rotor, this sleeve (which serves to increase the whirling speed considerably) abutting the compressor rotor at a comparatively large diameter, and making a push fit on the hollow shaft; and (d) means for axially clamping together the components of the rotor system.

A shaft assembly of three basic parts joins the compressor rotor to the turbine rotor; namely, the components specified at (a), (c) and (d) above. In this connection it will be appreciated that the turbine rotor runs at high temperature and the compressor rotor remains comparatively cool, and relative expansion of the various parts is catered for in the improved system.

Figure 2:
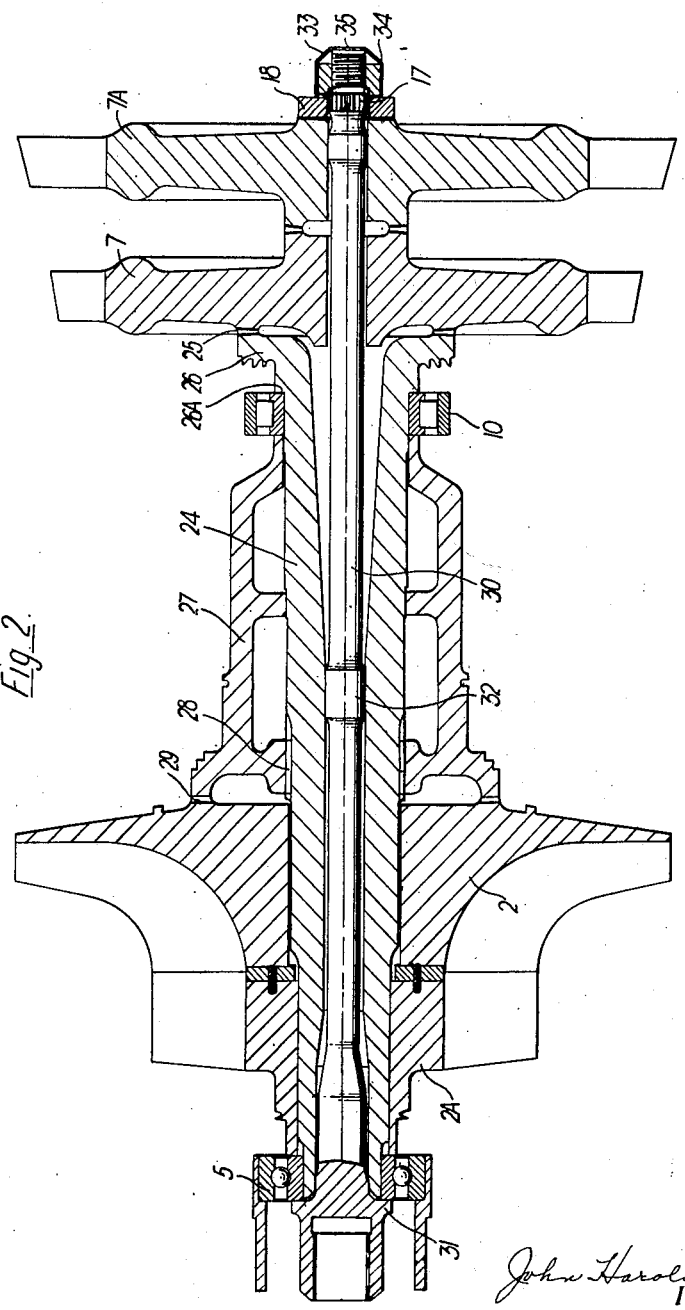

Referring to the accompanying drawings:

FIGURE 1 is a fragmentary sectional side elevation of a gas turbine rotor assembly embodying the invention; and FIGURE 2 is a sectional side elevation of another example of a gas turbine rotor assembly embodying the invention.

In the embodiment illustrated in FIGURE 1 the compressor rotor, indicated generally at 1, is an assembly consisting of a centrifugal compressor disc 2 and a shaft 3, the disc preferably being shrunk onto the shaft. At the end of the latter that is adjacent to the eye 4 of the compressor, one of the bearings 5 of the rotor assembly is located and is preferably arranged to take journal and thrust loads. A screw-threaded portion 3A of the shaft 3 is fitted with a collar nut 3B which abuts the inner race of the bearing 5. The other end of the shaft 3, which projects through the compressor disc 2, forms a spigot 6 for centralisation with the rest of the rotor assembly. The turbine rotor 7, or rotor assembly 7, 7A if (as illustrated) there is more than one of such rotors, is spigoted at 8 to a flanged hollow shaft 9 which passes through the turbine rotor bearing 10, and through a coaxial sleeve 11, and which finally locates over, and is splined at 6A to, the projecting spigot 6 of the compressor assembly. The whole is held together by a central threaded rod 12 and nut 13.

The turbine rotor bearing 10 is housed as closely as possible behind a flange 14 of the hollow shaft 9, which locates and supports the turbine rotor 7, in order that the overhand of the latter shall be reduced to a minimum as excessive overhang would reduce the whirling speed. Also, the areas of contact at 8 and 14A, between the turbine rotor 7 and the flange 14 of the mainshaft 9, are restricted to minimize thermal conduction. The assembly could be held together without the coaxial sleeve 11, but would then have a low whirling speed because the diameter of the turbine rotor shaft 9 is comparatively small. This is imposed by the desirability, already indicated, of keeping the diameter of the bearings of the rotor assembly as small as possible.

In order to increase the whirling speed considerably the coaxial sleeve 11 is comparatively large in diameter and is made a push fit on the hollow shaft 9 supporting the turbine rotor. In the preferred arrangement illustrated, the sleeve 11 has lands 15 by which it also supports the shaft 9 at two or more axially-spaced zones, and it abuts the back of the compressor rotor 2 at a comparatively large diameter, at 16. Consequently, throughout the rotor assembly between the bearings 5 and 10, there is a section of large section-modulus increasing, as the distance from the respective bearings increases, to a point (i.e. at 16) roughly midway between the two bearings. This caters for the increased bending moment which may be caused by out-of-balance of the rotor assembly, some of which is unavoidable even with the most careful balancing. It is essential that the parts of the assembly shall be in contact under all conditions of running, and this requires a compressive force to be applied between all the outer components. Namely, between the sleeve 11 and the compressor assembly 1; between the sleeve 11 and the inner race of the roller bearing 10; between this bearing and the back of the flange 14 holding the turbine rotor 7 or rotors 7, 7A, and between the latter and the associated flanged hollow shaft 9.

The rod 12, inserted through that shaft and screwed into the spigot 6 of the compressor assembly 1, is tightened by pulling up its nut 13 against the turbine rotor 7 or rotors 7, 7A. The rod 12 has a serrated portion 17 protruding from the rotor assembly 7, 7A and fitted with an internally-serrated washer 18. The latter has face splines or radial keys at 19 which are arranged to effect anti-rotational locking engagement with splines 20 on the hub face of the rotor 7A. Consequently, when the nut 13 is tightened, the clamping rod 12 suffers no twist and is subjected to pure tension. The nut 13 is screwed home and tensioned to any desired degree by means of a torque spanner or, preferably, by measuring the elongation of the rod 12. The latter, by virtue of its length, acts as a spring.

The nut 13 is provided with a two-tab locking washer 21 which is slotted to receive the radial keys 19 of the washer 18. The tabs of the locking washer 21 are folded so that they enter slots 22 in the outer end of the nut 13, and are joined together at 23 either by welding or by interlocking and folding. This resists the danger of centrifugal force opening up the tabs of the locking washer 21. Also, under no conditions of differential expansion does the nut 13 lose tension.

In the alternative embodiment illustrated in FIGURE 2, the rotor assembly has a hollow mainshaft 24 which passes through the compressor rotor's hub 2A, in which it is a push fit, and which is supported by the bearings 5 and 10. The turbine rotor 7 has a restricted area of contact at 25 with a locating flange 26 on the shaft 24. A coaxial sleeve 27 is splined to the shaft 24 at 28, abuts the back of the compressor rotor 2 at a comparatively large diameter, at 29, and also bears axially against the bearing 10 (which abuts the back of the flange 26 at 26A). Therefore, as in the case of FIGURE 1, throughout the rotor assembly between the bearings 5 and 10, there is a section of large section-modulus increasing, as the distance from the respective bearings increases, to a point (i.e. at 29) roughly midway between the two bearings. It will also be observed that the shaft 24 is coned internally over the portion adjoining its flange 26, and that the thickness of the wall of this shaft is greatest at a region approximately midway between the ends.

The whole rotor assembly is locked together by a clamping bolt 30. The latter, which is flanged at 31 to engage the bearing 5 without abutting the adjoining end of the shaft 24, has a land 32 located in the bore of that shaft, and is tensioned (without being twisted) and locked in similar manner to the rod 12 of FIGURE 1. But the nut-locking washer is arranged somewhat differently in FIGURE 2. Here, a two-tab locking washer 33 has internal serrations which (like those of the washer 18) engage the serrated portion 17 of the clamping bolt 30. The tabs of the locking washer 33 are folded along flats of the nut 34, then over the end of the bolt 30, and their ends are welded together at 35. It will, of course, be appreciated that each of the alternative nut-locking washer arrangements described and illustrated is equally applicable to either of the rotor assemblies disclosed.

By means of the constructions described all the desired characteristics are realised, namely, a shaft configuration for high whirling speed, having bearings of comparatively small diameter, and built to cater for the differential expansion due to the different temperatures of the various parts of the assembly. It is also a convenient configuration to reduce the conduction of heat from the hot parts, namely, the turbine rotor or rotors, as it is readily possible to make the contact area, between the latter and the flange of the associated shaft, very small.

I claim:
1. In a gas turbine rotor system in which a compressor rotor is coaxially arranged with respect to and is driven by a turbine rotor, said rotors being axially spaced apart, the improvement which comprises a driving shaft for the compressor rotor, means for driveably connecting the turbine rotor and said driving shaft comprising a hollow shaft having at one end a radially extending flange provided with connecting means on its outer face adjacent the peripheral portion of said flange connecting the latter with said turbine rotor, said hollow shaft at its other end surrounding said driving shaft and being driveably connected thereto, a shaft bearing surrounding said hollow shaft and positioned adjacent the inner face of said flange, a hollow sleeve surrounding said hollow shaft and positioned between said bearing and said compressor rotor, said sleeve being provided with a radially extending flange having a face thereof adjacent the peripheral portion of the last named flange engaging the compressor rotor, and means for axially clamping said hollow shaft and said hollow sleeve between said turbine and said compressor rotors.

2. A gas turbine rotor system according to claim 1, in which the hollow sleeve bears axially against the shaft bearing.

3. A gas turbine rotor system according to claim 1, in which the hollow sleeve is provided with lands by which it supports the hollow shaft at at least two axially-spaced zones.

4. A gas turbine rotor system according to claim 1, in which the hollow shaft passes axially through the compressor rotor and is splined to the hollow sleeve.

References Cited in the file of this patent
UNITED STATES PATENTS

| | | |
|---|---|---|
| 2,480,095 | Buchi | Aug. 23, 1949 |
| 2,805,819 | Buchi et al. | Sept. 10, 1957 |